(12) United States Patent
Kang et al.

(10) Patent No.: US 6,701,042 B1
(45) Date of Patent: Mar. 2, 2004

(54) ARRAYED WAVEGUIDE GRATING MODULE AND DEVICE AND METHOD FOR MONITORING OPTICAL SIGNAL USING THE SAME

(75) Inventors: Yong-Hoon Kang, Goyang (KR); Jeong-Mee Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,533

(22) Filed: Jan. 14, 2000

(30) Foreign Application Priority Data

Jan. 14, 1999 (KR) .............................................. 1999-845

(51) Int. Cl.[7] ................................................ G02B 6/34
(52) U.S. Cl. .......................................... 385/37; 385/24
(58) Field of Search .............................. 385/24, 37, 15, 385/12, 13; 359/124, 127, 130; 372/20, 102; 398/82, 84, 85, 87, 95

(56) References Cited

U.S. PATENT DOCUMENTS

| | | | |
|---|---|---|---|
| 5,136,671 A | | 8/1992 | Dragone |
| 5,617,234 A | | 4/1997 | Koga et al. |
| 5,671,304 A | | 9/1997 | Duguay |
| 5,809,184 A | | 9/1998 | Doerr et al. |
| 5,870,216 A | | 2/1999 | Brock et al. |
| 5,978,539 A | | 11/1999 | Davies et al. |
| 5,986,782 A | | 11/1999 | Alexander et al. |
| 6,055,078 A | * | 4/2000 | Chen et al. ................. 359/130 |
| 6,192,170 B1 | * | 2/2001 | Komatsu ..................... 385/15 |
| 6,465,803 B1 | * | 10/2002 | Bowers et al. ................. 257/21 |
| 6,526,203 B1 | * | 2/2003 | Gonzalez et al. ............. 385/37 |
| 2002/0191887 A1 | * | 12/2002 | Bidnyk ........................ 385/15 |

FOREIGN PATENT DOCUMENTS

| | | | |
|---|---|---|---|
| EP | 0703679 A2 | 3/1996 | |
| EP | 0826989 A3 | 7/1998 | |
| EP | 0826989 A2 | 10/1998 | |
| GB | 2324667 A | 10/1998 | |
| GB | 2334594 A | 8/1999 | |
| JP | 08050313 A | * 2/1996 | ............. G02F/3/00 |
| JP | 10173603 | 6/1998 | |
| JP | 11038265 | 2/1999 | |
| JP | 2001044938 A | * 2/2001 | ........... H04B/10/08 |
| WO | WO 99/57834 | 11/1999 | |

* cited by examiner

*Primary Examiner*—Hemang Sanghavi
(74) *Attorney, Agent, or Firm*—Robert E. Bushnell, Esq.

(57) ABSTRACT

An arrayed waveguide grating (AWG) module monitors the quality of a wavelength division multiplexed (WDM) multi-channel optical signal without using a special measurer in a wavelength division multiplexing (WDM) system, and a device monitors a WDM optical signal using the AWG module. The AWG module includes an input waveguide, a first star coupler, an AWG unit, a second star coupler, and an optical power measurer. The input waveguide receives the WDM optical signal via an optical signal transmission medium. The first star coupler splits the power of the received WDM optical signal and transmits split optical signals to waveguides of the AWG unit. The AWG unit processes the split optical signals so that they have phase differences which are proportional to the difference between the lengths of the waveguides included in the AWG unit. The second star coupler focuses the optical signals received from the AWG unit at different locations by causing mutual interference between the received optical signals. The optical power measurer is directly connected to the second star coupler, and generates electrical signals depending on power values of the optical signals focused by the second star coupler. As a result, the characteristics of the optical signals of different channels constituting a WDM optical signal can be measured without a special measurer, and the spectrum of an optical signal with respect to the overall wavelength band can also be obtained. Also, the AWG module has a structure which is suitable for mass production.

25 Claims, 2 Drawing Sheets

ARRAYED WAVEGUIDE GRATING MODULE AND DEVICE AND METHOD FOR MONITORING OPTICAL SIGNAL USING THE SAME

CLAIM OF PRIORITY

This application makes reference to, incorporates the same herein, and claims all benefits accruing under 35 U.S.C. §119 from my application ARRAYED WAVEGUIDE GRATING MODULE AND DEVICE FOR MONITORING OPTICAL SIGNAL USING THE SAME filed with the Korean Industrial Property Office on Jan. 14, 1999 and there duly assigned Ser. No. 845/1999.

BACKGROUND OF THE INVENTION

1. Technical Field

The present invention relates to an arrayed waveguide grating (AWG) module for monitoring the characteristics of a wavelength division multiplexed (WDM) optical signal for multiple channels without using a special measuring instrument in a wavelength division multiplexing (WDM) system, and to an optical signal monitoring device and method for monitoring a WDM optical signal using the AWG module.

2. Related Art

In a WDM system, where several optical channels are multiplexed and transmitted to one optical cable, the quality of the WDM optical signal must be monitored before the WDM optical signal is optically demultiplexed into channels.

Generally, the optical power, optical wavelength and optical signal-to-noise ratio (OSNR) of an optical signal of each channel must be measured to monitor a WDM multi-channel optical signal. In a WDM optical transmission device, the wavelength deviation of each channel must be accurately controlled since it causes error not only upon transmission of a signal for a corresponding channel, but also upon transmission of signals of channels adjacent to the corresponding channel. Also, control situations must be monitored in real time. Furthermore, the optical power and the OSNR of optical signals may be different for each channel when a WDM optical amplifier is used, so that the power and the OSNR of each channel must be monitored.

U.S. Pat. No. 5,617,234 to Koga et al., entitled MULTI-WAVELENGTH SIMULTANEOUS MONITORING CIRCUIT EMPLOYING ARRAYED-WAVEGUIDE GRATING, issued on Apr. 1, 1997 discloses a structure using an AWG and a photodiode array. In Koga '234, the wavelength of each channel can be monitored, but the temperature of the AWG must be controlled in real time, an optical signal for providing a reference wavelength is separately required, and the optical power and the OSNR of an optical signal cannot be accurately measured. Also, in the WDM optical transmission system, the optical power, the optical wavelength and the OSNR of each channel signal must be able to be simultaneously monitored. However, in the prior art using an AWG, when two arbitrary items among the three measuring items are measured, the remaining item cannot be measured.

The following additional patents are considered to be representative of the prior art relative to the invention disclosed herein but are burdened by disadvantages discussed herein: U.S. Pat. No. 5,136,671 to Dragone, entitled OPTICAL SWITCH, MULTIPLEXER, AND DEMULTIPLEXER, issued on Aug. 4, 1992; U.S. Pat. No. 5,870,216 to Brock et al., entitled SPLITTERLESS OPTICAL BROADCAST SWITCH, issued on Feb. 9, 1999; U.S. Pat. No. 5,671,304 to Duguay, entitled TWO-DIMENSIONAL OPTOELECTRONIC TUNE-SWITCH, issued on Sep. 23, 1997; U.S. Pat. No. 5,978,539 to Davies et al., entitled OPTICAL DEVICE HAVING A TEMPERATURE INDEPENDENT SPECTRAL RESPONSE USING NONPLANAR GEOMETRIC DISTORTION OF A SUBSTRATE, issued on Nov. 2, 1999; and U.S. Pat. No. 5,986,782 to Alexander et al., entitled SIGNAL-TO-NOISE MONITORING IN WDM OPTICAL COMMUNICATION SYSTEMS, issued on Nov. 16, 1999.

SUMMARY OF THE INVENTION

An objective of the present invention is to provide an arrayed wavelength grating (AWG) module for monitoring a wavelength division multiplexed (WDM) multi-channel optical signal in a wavelength division multiplexing (WDM) optical transmission system.

Another objective of the present invention is to provide a device and method for measuring not only the wavelength, optical power and optical signal-to-noise ratio (OSNR) of each channel signal of a WDM multi-channel signal, but also the optical spectrum with respect to an overall optical signal wavelength band.

To achieve the first objective of the invention, there is provided an arrayed waveguide grating (AWG) module which includes: an input waveguide for receiving a wavelength division multiplexed (WDM) optical signal via an optical signal transmission medium; a first star coupler for splitting the power of the WDM optical signal received from the input waveguide, and for transmitting the split optical signals to the waveguides of an AWG unit; an AWG unit for processing the split optical signals output by the first star coupler so that the split optical signals have phase differences which are proportional to the difference between the lengths of the waveguides included in the AWG unit; a second star coupler for focusing the optical signals received from the AWG unit on different locations by causing mutual interference between the received optical signals; and an optical power measurer directly connected to the second star coupler for generating electrical signals dependent on the power values of the optical signals output by the second star coupler.

To achieve the second objective of the invention, there is provided a device and method for monitoring a wavelength division multiplexed (WDM) optical signal. The device includes: an AWG module for receiving the WDM optical signal, for splitting the WDM optical signal into optical signals for different channels, and for converting the split optical signals into electrical signals; an analog-to-digital converter for converting the electrical signals into digital signals; and a data processor for processing the digital signals to analyze the characteristics of the received optical signals.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
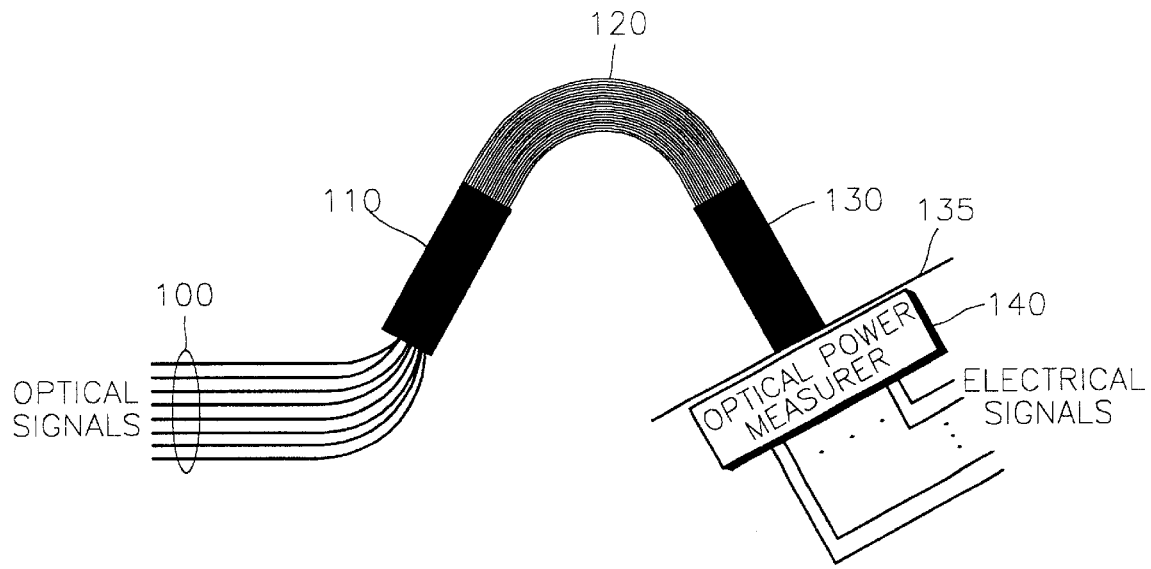
FIG. 1 shows an arrayed waveguide grating (AWG) module according to the present invention.

FIG. 1 shows an arrayed waveguide grating (AWG) module according to the present invention. Referring to FIG. 1, an arrayed waveguide grating (AWG) module according to an embodiment of the present invention includes an input waveguide 100, a first star coupler 110, an AWG unit 120, a second star coupler 130, and an optical power measurer 140.

A wavelength division multiplexed (WDM) optical signal which is to be monitored is incident upon the input waveguide 100 via an optical fiber (not shown). The WDM optical signal introduced via the input waveguide 100 is split by the first star coupler 110 which acts as an optical power splitter, and the split optical signals are incident upon the AWG unit 120. In the AWG unit 120, the phase of the WDM optical signal is shifted.

Split WDM optical signals having different wavelengths, and which have passed through the AWG unit 120, have phase differences which are proportional to the difference between the lengths of waveguides in the AWG unit 120. That is, while these phase-shifted optical signals mutually interfere, the WDM optical signal is split into optical signals having different wavelengths. The optical signals which have passed through the AWG unit 120 are applied to the second star coupler 130. The second star coupler 130 causes mutual interference between the received optical signals so that the optical signals of different wavelengths are focused on different positions on an optical spectrum detecting surface 135 according to each wavelength. The optical power measurer 140 is positioned on the optical spectrum detecting surface 135 so that the optical power measurer 140 is directly connected to the second star coupler 130 via the detecting surface 135. The optical power measurer 140 converts the power of an optical signal for each wavelength output by the second star coupler 130 into a current signal. The optical power measurer 140 can be a photodiode array or a charge-coupled device.

Figure 2:
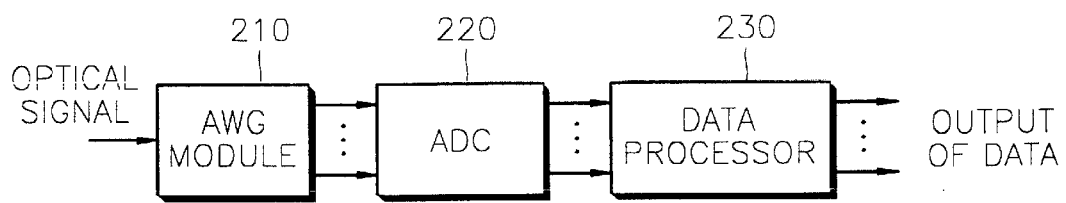
FIG. 2 is a block diagram of an optical signal or channel monitoring device using an AWG module according to the invention.

FIG. 2 is a block diagram of a an optical signal or channel monitoring device using an AWG module according to the present invention. Referring to FIG. 2, the monitoring device includes an AWG module 210, an analog-to-digital converter (ADC) 220, and a data processor 230. The AWG module 210 has the above-described configuration of FIG. 1. The AWG module 210 converts the power of an optical signal into an electrical signal such as a current signal, and the electrical signal is applied to the ADC 220 which converts the electrical signal into digital data. The digital data is applied to the data processor 230, and the optical power, the optical wavelength, the OSNR and the spectrum of the overall optical wavelength band are monitored as described below. The data processor 230 can be a microprocessor, or the like.

Figure 3:
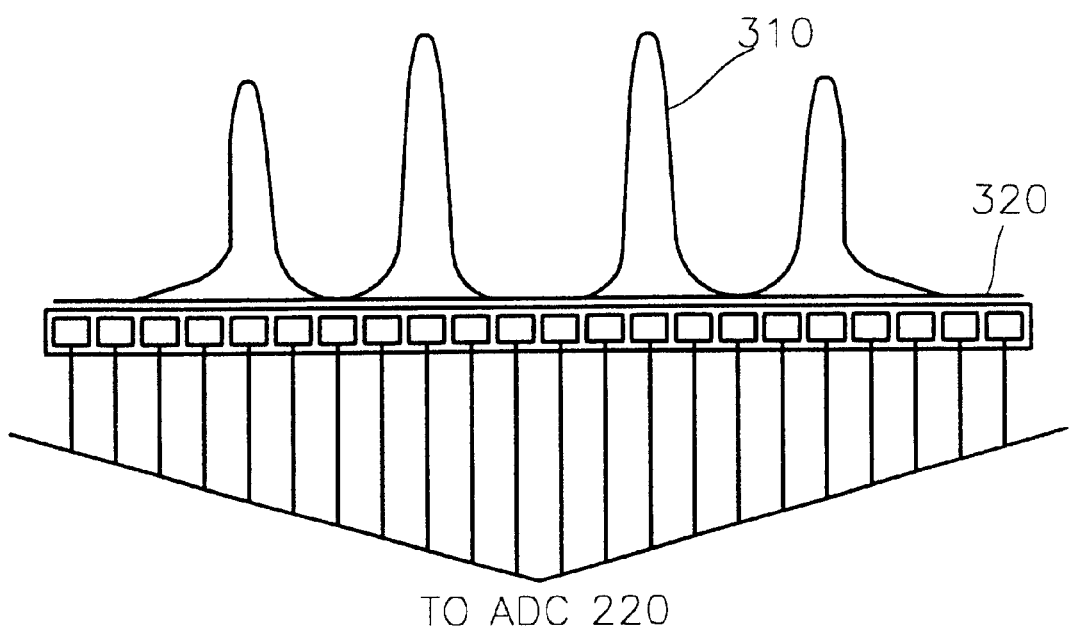
FIG. 3 shows a spectrum on an optical spectrum detecting surface.

The spectrum of an optical wavelength on the optical spectrum detecting surface 135, which is a contact surface of the second star coupler 130 and the optical power measurer 140, is shown in FIG. 3. An existing AWG module provides optical waveguides at positions, on the optical spectrum detecting surface 135, at which optical signals for different channels are focused, and each channel is introduced to optical fibers. However, the AWG module 210 according to the present invention does not provide optical waveguides at the optical spectrum detecting surface 135. Instead, it employs a photodiode array or a charge-coupled device. Consequently, the optical spectrum of an optical signal is obtained with respect to the overall wavelength band, and is used to monitor the characteristics of the WDM optical signal.

Optical signals of different wavelengths are focused at different positions on the optical spectrum detecting surface 135 along a horizontal axis 320 due to the wavelength splitting function of the AWG unit 120 of FIG. 1. As a result, an optical spectrum 310 is formed along the horizontal axis 320 on the optical spectrum detecting surface 135. When a photodiode array or charge-coupled device is connected to the output of the second star coupler 130, light beams having different wavelengths are incident upon the photodiode of the photodiode array or upon the pixels of the charge-coupled device, according to their wavelengths.

In a method of detecting optical signals incident upon different pixels on the photodiode array or charge-coupled device, a reference optical signal having a known wavelength is received in advance, and it is detected on the pixel for which the reference optical signal is output. Thus, it can be seen that the detected pixel is for the wavelength of the reference optical signal. Also, the optical power of an optical wavelength incident upon a pixel can be inferred from a current value output from the pixel. Thus, the optical power can be detected for each wavelength. Furthermore, the OSNR of an optical signal can be obtained by comparing a current value, obtained from a pixel on which the incident optical signal has been detected, with current values obtained from the other pixels. Furthermore, more accurate resolution can be obtained with an increase in the number of photodiodes within the photodiode array or the number of pixels on the charge-coupled device.

Consequently, the optical power, optical wavelength and OSNR of the optical signal of each channel can be obtained. An optical spectrum of a WDM optical signal can also be obtained with respect to the entire wavelength band.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An arrayed waveguide grating (AWG) module, comprising:
    an input waveguide for receiving a wavelength division multiplexed (WDM) optical signal via an optical signal transmission medium;
    a first star coupler for splitting power of the WDM optical signal received by the input waveguide to obtain split optical signals, and for transmitting the split optical signals;
    an AWG unit having waveguides for receiving the split optical signals, and for processing the split optical signals so that the split optical signals have phase differences which are proportional to a difference between lengths of the waveguides of the AWG unit, said AWG unit producing processed optical signals;
    a second star coupler for focusing the processed optical signals at different locations by causing mutual interference between the processed optical signals; and
    an optical power measurer directly connected to the second star coupler for generating electrical signals depending on power values of the processed optical signals focused by the second star coupler;

wherein said optical power measurer comprises one of a photodiode array and a charge-coupled device.

2. The AWG module of claim 1, said AWG module further comprising an optical spectrum detecting surface disposed between said second star coupler and said optical power measurer, wherein said second star coupler focuses the processed optical signals at different locations on said optical spectrum detecting surface.

3. The AWG module of claim 2, wherein said optical power measurer is directly connected to said optical spectrum detecting surface.

4. An arrayed waveguide grating (AWG) module comprising:

an input waveguide for receiving a wavelength division multiplexed (WDM) optical signal via an optical signal transmission medium;

a first star coupler for splitting power of the WDM optical signal received by the input waveguide to obtain split optical signals, and for transmitting the split optical signals;

an AWG unit having waveguides for receiving the split optical signals and for processing the split optical signals so that the split optical signals have phase differences which are proportional to a difference between lengths of the waveguides of the AWG unit, said AWG unit producing processed optical signals;

a second star coupler for focusing the processed optical signals at different locations by causing mutual interference between the processed optical signals; and an optical power measurer directly connected to the second star coupler for generating electrical signals depending on power values of the processed optical signals focused by the second star coupler;

said AWG module further comprising an optical spectrum detecting surface disposed between said second star coupler and said optical power measurer, wherein said second star coupler focuses the processed optical signals at different locations on said optical spectrum detecting surface.

5. The AWG module of claim 4, wherein said optical power measurer is directly connected to said optical spectrum detecting surface.

6. A device for monitoring a wavelength division multiplexed (WDM) optical signal, the device comprising:

an AWG module for receiving the WDM optical signal, for splitting the WDM optical signal into optical signals for different channels, and for converting the optical signals for different channels into electrical signals;

an analog-to-digital converter for converting the electrical signals into digital signals; and a data processor for processing the digital signals to monitor the characteristics of the received WDM optical signal;

wherein said AWG module includes processing means for processing split optical signals to produce processed optical signals, and optical power measurer means for generating electrical signals depending on power values of the processed optical signals.

7. The device of claim 6, wherein said processing means comprises:

a first star coupler for splitting power of the received WDM optical signal to obtain the split optical signals, and for transmitting the split optical signals;

an AWG unit for processing the split optical signals to produce the processed optical signals; and a second star coupler for focusing the processed optical signals at different locations; and wherein said optical power measurer means generates the electrical signals depending on the power values of the processed optical signals as focused by the second star coupler.

8. The device of claim 7, wherein said AWG unit has waveguides for receiving the split optical signals.

9. The device of claim 8, wherein said AWG unit processes the split optical signals so that the split optical signals have phase differences which are proportional to a difference between lengths of the waveguides of the AWG unit.

10. The device of claim 7, wherein said second star coupler focuses the processed optical signals at said different locations by causing mutual interference between the processed optical signals.

11. The device of claim 6, wherein said optical power measurer means comprises one of a photodiode array and a charge-coupled device.

12. The device of claim 6, wherein said AWG module further comprises an optical spectrum detecting surface disposed between said processing means and said optical power measurer means, and wherein said processing means focuses the processed optical signals at different locations on said optical spectrum detecting surface.

13. The device of claim 12, wherein said optical power measurer means is directly connected to said optical spectrum detecting surface.

14. A method of monitoring a wavelength division multiplexed (WDM) optical signal, said method comprising the steps of;

receiving the WDM optical signal;

splitting the WDM optical signal into optical signals for different channels;

converting the split optical signals into electrical signals;

converting the electrical signals into digital signals; and processing the digital signals to analyze the characteristics of the received optical signals;

wherein the analyzed characteristics of the received WDM optical signal include at least one of wavelength, optical power and optical signal-to-noise ratio of each optical signal of a different channel, and also include an optical spectrum with respect to an overall optical signal wavelength band of the WDM optical signal.

15. A method of monitoring a wavelength division multiplexed (WDM) optical signal, said method comprising the steps of:

receiving the WDM optical signal;

splitting the WDM optical signal into optical signals for different channels:

converting the split optical signals into electrical signals;

converting the electrical signals into digital signals; and processing the digital signals to analyze the characteristics of the received optical signals;

wherein said split optical signals are received by waveguides, said method further comprising the step, after the splitting step, of processing the split optical signals so that the split optical signals have phase differences which are proportional to a difference between lengths of the waveguides.

16. The method of claim 15, further comprising the step, after the processing step, of focusing the processed split optical signals at different locations by causing mutual interference between the processed split optical signals.

17. The method of claim 16, further comprising the step, after the focusing step, of measuring power values of the focused optical signals, whereby to generate the electrical signals.

18. The method of claim 16, further comprising the step of providing an optical spectrum detecting surface, and wherein the focusing step comprises focusing the processed split optical signals at said different locations on the optical spectrum detecting surface.

19. The method of claim 18, further comprising the steps of receiving a reference optical signal having a known wavelength, and detecting at which location on the optical spectrum detecting surface the reference optical signal is output.

20. The method of claim 18, further comprising the steps of providing one of a photodiode array and a charge-coupled device as the optical spectrum detecting surface, and determining an optical power of an optical wavelength incident upon one of a photodiode and a pixel of said optical spectrum detecting surface from a current value output from said one of a photodiode and a pixel of said optical spectrum detecting surface.

21. The method of claim 18, further comprising the steps of providing one of a photodiode array and a charge-coupled device as the optical spectrum detecting surface, and determining a n optical signal-to-noise ratio of the received WDM optical signal by comparing a current value, obtained from one of a photodiode and a pixel of the optical spectrum detecting surface on which an incident optical signal has been detected, with current values obtained from one of other photodiodes and other pixels of the optical spectrum detecting surface.

22. A method of monitoring a wavelength division multiplexed (WDM) optical signal, said method comprising the steps of:

receiving the WDM optical signal;

splitting the WDM optical signal into optical signals for different channels;

converting the split optical signals into electrical signals;

converting the electrical signals into digital signals; and processing the digital signals to analyze the characteristics of the received optical signals;

said method further comprising the step, after the processing step, of focusing the processed split optical signals at different locations by causing mutual interference between the processed split optical signals; and said method further comprising the step of providing an optical spectrum detecting surface, and wherein the focusing step comprises focusing the processed split optical signals at said different locations on the optical spectrum detecting surface.

23. the method of claim 22, further comprising the steps of receiving a reference optical signal having a known wavelength, and detecting at which location on the optical spectrum detecting surface the reference optical signal is output.

24. The method of claim 22, further comprising the steps of providing one of a photodiode array and a charge-coupled device as the optical spectrum detecting surface, and determining an optical power of an optical wavelength incident upon one of a photodiode and a pixel of said optical spectrum detecting surface from a current value output from said one of a photodiode and a pixel of said optical spectrum detecting surface.

25. The method of claim 22, further comprising the steps of providing one of a photodiode array and a charge-coupled device as the optical spectrum detecting surface, and determining an optical signal-to-noise ratio of the received WDM optical signal by comparing a current value, obtained from one of a photodiode and a pixel of the optical spectrum detecting surface on which an incident optical signal has been detected, with current values obtained from one of other photodiodes and other pixels of the optical spectrum detecting surface.

* * * * *